Aug. 27, 1968   L. BALOGH ET AL   3,398,507

METHOD OF PRODUCING HYPERSONIC FLUID FLOW

Filed July 19, 1963

INVENTORS
L. Balogh
E. Klinkhardt

Watson, Cole, Grindle Watson
Attys.

United States Patent Office 3,398,507
Patented Aug. 27, 1968

3,398,507
METHOD OF PRODUCING HYPERSONIC
FLUID FLOW
Lorant Balogh, Hochdahl, Victor Denk, Wittlaer, Erhard
Klinkhardt, Hochdahl, and Eugen Sänger, Stuttgart-
Vaihingen, Germany, assignors to Firma Aviatest
G.m.b.H., Dusseldorf, Germany
Filed July 19, 1963, Ser. No. 296,164
Claims priority, application Germany, July 27, 1962,
R 33,213
9 Claims. (Cl. 55—55)

This invention relates to a method of producing fluid flows in the high supersonic, or hypersonic, range.

For technical research and development work on high-speed aircraft, flying missiles, space vehicles, etc. and on their power plants, for example, turbojet power plants, ramjet power plants, rocket power plants, experimental aerodynamic investigations under hypersonic flow conditions are necessary, i.e., with flow velocities of more than about 5 times the velocity of sound in the flow medium concerned.

These investigations relate to the external flow around, and the internal flow through, the test objects, serving primarily to elucidate the mechanical, thermal and electrical behaviour of the flow, and may be carried out in wind tunnels, test beds, etc.

For certain problems, it is possible to confine investigations and research to the mechanical effects of the flow and, in this case, the high ratios of flow velocity to the velocity of sound can be obtained with moderate flow velocities by use as the flow medium, one in which the velocity of sound is considerably reduced.

To this end it has been proposed to provide a flow medium in the form of a gas or vapour charged with finely divided heavy liquid or solid masses (e.g., mist droplets, dust, liquid skins), so that a very dense flow of mist, dust or foam is produced in which the light gaseous constituent and the heavy liquid or solid constituent achieve a common mechanical effect, i.e., as complete an exchange of impulse as possible takes place between them.

The laws of mechanics and practical experience shows that the velocity of sound in such a mixture falls below the velocity of sound in the individual constituents.

In order to more clearly set forth the invention, reference may be had to the drawings in which.

Figure 1:
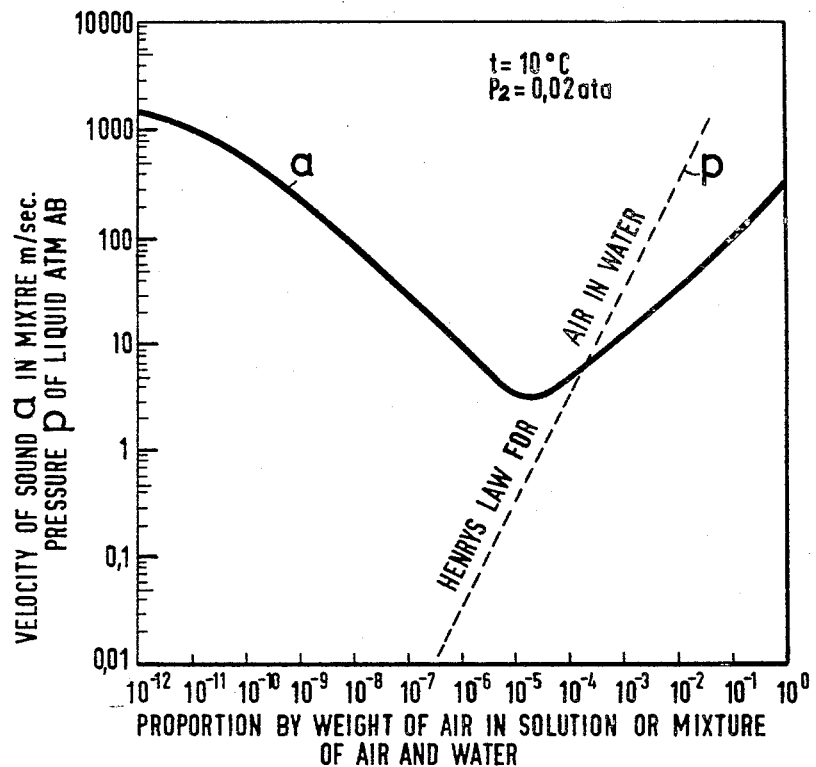
FIG. 1 is a diagram as to velocity of sound and weight of air.

As an example of the comparison of sound and air, the curve $a$ in FIG. 1 shows the theoretical variation of the velocity of sound in mixtures consisting of water and air with the proportion by weight of air in the mixture, plotted for the case where the mixture is under 0.02 atm. abs. pressure and has a low temperature, 10° C.

The curve $a$ shows a flat minimum for the velocity of sound of about 3.4 m./sec. at the very low proportion by weight of $2.10^{-5}$ of the air in the mixture, the respective volumes of air and water in the mixture being approximately equal, whereas, as is known, the velocity of sound in water free from air is 1500 m./sec. and in air is 340 m./sec.

In mixtures consisting of other liquids and other gases, similar results are observed.

According to the well known Henry's law, the maximum proportion by weight of the gas which can be absorbed by the liquid at a fixed temperature is proportional within wide limits to the pressure.

By way of example, the curve or line $p$ in FIG. 1 illustrates this law for the dissolution of air in water, and it will be seen that, for instance, in water at 1 atm. abs. pressure, a proportion by weight of up to about $2.10^{-5}$ can be dissolved, that is that proportion by weight which, after complete separation, would give the minimum velocity of sound in the air-water mixture.

According to the invention, in order to produce in practice high-speed flows of such mixtures poor in gas, a solution is produced, under elevated pressure, of a suitable gas in the liquid which is maintained at a sufficiently low temperature that its inherent vapour pressure is negligible, this gas-liquid solution, under elevated pressure, is then expanded by passage through a discharge nozzle to a preselected low external pressure.

In this process, on the one hand, the liquid assumes a discharge velocity $v$ which, by way of approximation, is defined by the simple hydrodynamic equation $$v = \sqrt{2(p_1 - p_2)/\delta}$$

since the total enthalpy of the small proportion of gas constitutes only fractions of per mille of the energy content of the pressurised liquid, that is the gas does not assist, practically speaking, in the acceleration of the flow. In the equation, $p_1$=the elevated pressure of the gas-liquid solution, $p_2$=the preselected low external presure, $\delta$=the density of the liquid. In the case of the release of the pressure of water from 20 atm. abs. to 0.02 atm. abs. the corresponding discharge velocity would be about 65 m./sec.

On the other hand, according to Henry's law, on this drop in pressure, part of the dissolved gas is separated from the solution and appears in the liquid in the form of bubbles or intermediate spaces between droplets of liquid, as can be observed in daily life in carbonated water, sparkling wine, etc.

It is an easy matter to obtain the result that the quantity of the desorbed gas is at the level required for obtaining very small sound velocities, so that in the above example, the velocity of sound falls to about 3.4 m./sec. and the ratio of flow velocity to sound velocity, that is the flow Mach number, thereby becomes $v/a = 65/3.4 = 19$, that is lies in the high hypersonic range.

Since, by the difference between initial pressure $p_1$ and final pressure $p_2$, the flow velocity can be controlled and, independently thereof, within the limits of this pressure range, the dissolved and separated proportion of gas and thereby the velocity of sound, any desired hypersonic Mach number up to extremely high values can be adjusted as desired.

For example, in the numerical example used for the air-water mixture, a desired elimination of gas of $2.10^{-5}$ parts by weight can be obtained by using water at atmospheric pressure and a temperature of 10° C. which, according to the Henry curve, contains in saturated solution about $2.10^{-5}$ parts by weight of air. This water is pressurised by means of a pump in a closed pipe system to 20 atm. abs. pressure, having no opportunity of increasing its air content in accordance with the now higher dissolution potential of the water. On the subsequent reduction of pressure to, for example, 0.02 atm. abs., this dissolved proportion of gas is almost completely desorbed, in accordance with the Henry curve in FIG. 1, and in this way produces the desired homogeneous mixture.

In particular, by suitable choice of the level of the initial pressure and of the desorbed proportion of gas, any desired flow Mach number can be obtained in this manner.

Figure 2:
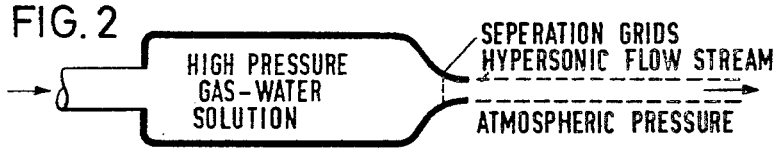
FIG. 2 is a diagrammatic view of a gas water solution.
Figure 3:
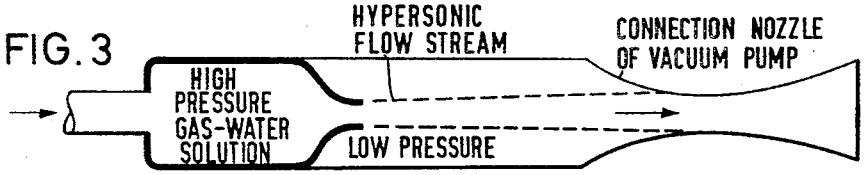
FIG. 3 is a diagrammatic view of a gas water solution and a connecting nozzle.

FIGS. 2 and 3 show diagrammatically arrangements for producing hypersonic jet flow streams in accordance with this invention, such as can be used, for instance, for wind tunnels, test beds, etc.

The apparatus illustrated by FIG. 2 consists essentially of a pressure vessel, containing the gas-liquid solution under elevated pressure, and a discharge nozzle in which the pressure of the solution is reduced to the external pressure, in this case the surrounding atmospheric pressure.

During the discharge, the pressure can be maintained in the pressure vessel, for example, by means of pressure gas provided in sufficient quantity in the vessel, or by continuous replenishment of the pressure gas. In this case, the gas will be dissolved in the liquid up to the saturation limit corresponding to the elevated pressure.

Alternatively, as illustrated by FIG. 2, the liquid in the pressure vessel can also be continuously replenished by means of a pressure pump or the like from a non-pressurized supply and in this way the pressure in the solution can be maintained, without increasing the gas content of the liquid beyond the degree of saturation of the pressure in the supply container.

In order to accelerate the separation or desorption of the dissolved gas from the liquid during the flow discharge to the lower external pressure, separation edges, separation grids, etc., can be positioned in the flow path, these devices creating free surfaces within the liquid.

FIG. 3 illustrates a similar arrangement, to that illustrated by FIG. 2, in which the reduction of pressure of the gas-liquid solution to pressures lower than the surrounding atmospheric pressure takes place in a low-pressure vessel.

The low pressure in the vacuum vessel can be maintained by means of special vacuum pumps, but, as illustrated by FIG. 3, the hypersonic jet stream itself may be used for driving a liquid-jet vacuum pump to produce the low pressure for forming the hypersonic jet itself.

We claim:
1. A method for producing hypersonic fluid flow by using a substantially gas-liquid-phase mixture having a heavily reduced sound velocity comprising the steps of providing a substantially homogeneous solution in which the gas-phase part of the desired mixture is dissolved in the liquid-phase part in such a ratio that the dissolved gas is at least partly desorbed by decreasing the pressure of the solution, and passing the pressurized solution through fluid flow passages so that the flow velocity increases and the pressure of the solution drops to such an extent that an amount of gas is desorbed resulting in a gas-liquid-phase mixture in which the sound velocity is sufficiently reduced so that the rate of flow velocity to sound velocity is that wherein Mach number lies in the hypersonic range.

2. The method according to claim 1, in which the said pressure of the solution which drops is reduced to at least atmospheric pressure.

3. The method according to claim 1, in which the said pressurized solution is passed through the said fluid flow passages into a chamber maintained at a subatmospheric pressure by vacuum pump means.

4. The method according to claim 1, in which the said pressurized solution is passed through the said fluid flow passages into a chamber maintained at a subatmospheric pressure by vacuum pump means which is a vacuum liquid-jet pump means operated by the said fluid flow stream.

5. The method according to claim 1, in which the said pressure of the said solution is reduced to about 0.02 atmospheric absolute pressure.

6. A method for producing hypersonic fluid flow by using a substantially gas-liquid-phase mixture having a heavily reduced sound velocity comprising the steps of providing a saturated solution at elevated pressure of a gas in a liquid at a sufficiently low temperature so that the vapour pressure of the liquid remains low, creating a fluid flow stream by passing the said pressurized saturated solution through fluid flow passages so that the flow velocity of the solution increases whereby the pressure of the solution drops and part of the dissolved gas is desorbed, and decreasing the pressure of the solution so that the amount of the said desorbed gas results in a homogeneous mixture of the said gas and the said liquid in which the velocity of sound is sufficiently reduced that the said fluid flow stream has a hypersonic velocity.

7. A method for producing hypersonic fluid flow by using a substantially gas-liquid-phase mixture having a heavily reduced sound velocity comprising the steps of providing an unsaturated solution at elevated pressure of a gas in a liquid at a low temperature so that the vapour pressure of the liquid remains low, passing a fluid flow stream so that the said unsaturated solution flows through passages so that the flow velocity of the solution increases, the pressure of the solution drops and part of the dissolved gas is desorbed, and the pressure drop forms a homogeneous mixture of said desorbed gas and the said liquid in which the desorbed gas content is determined by the amount of gas in the said unsaturated solution and the velocity of sound in the said homogeneous mixture is sufficiently reduced that the velocity of the said fluid flow stream lies within the hypersonic range.

8. The method according to claim 7, in which the saturated solution of the said gas and liquid at an initial pressure is created, elevating the pressure of the said saturated solution without introducing any further gas into the solution so that said nonsaturated solution is produced, and in which during the last-mentioned step the pressure of the said pressurized nonsaturated solution is reduced to such a pressure below the said initial pressure that there is obtained a desired degree of desorption of the gas from the said solution.

9. The method according to claim 7, in which the saturated solution of the said gas and liquid at an initial pressure is created, elevating the pressure of the said saturated solution without introducing any further gas into the solution so that said nonsaturated solution is produced, and in which during the last-mentioned step the pressure of the said pressurized nonsaturated solution is reduced to such a pressure below the said initial pressure that there is obtained a desired degree of desorption of the gas from the said solution, and the said initial pressure is atmospheric pressure.

References Cited

UNITED STATES PATENTS

| | | | |
|---|---|---|---|
| 1,449,114 | 3/1923 | Hayduck | 55—178 |
| 2,522,005 | 9/1950 | Whitlock et al. | 55—41 |
| 2,951,554 | 9/1960 | Becker | 55—17 |

FOREIGN PATENTS

| | | |
|---|---|---|
| 794,834 | 5/1958 | Great Britain. |
| 930,151 | 7/1963 | Great Britain. |

OTHER REFERENCES

Lapple, C. E.: Fluid and Particle Mechanics, Delaware, University of Delaware, 1956, pp. 144 and 145.

REUBEN FRIEDMAN, *Primary Examiner.*

C. N. HART, *Assistant Examiner.*